(12) United States Patent
Littlefield et al.

(10) Patent No.: US 9,950,607 B2
(45) Date of Patent: Apr. 24, 2018

(54) POWERTRAIN WITH MULTI-PLANETARY, SINGLE MOTOR DRIVE UNIT

(71) Applicant: GM GLOBAL TECHNOLOGY OPERATIONS LLC, Detroit, MI (US)

(72) Inventors: Joseph Ralph Littlefield, Waterford, MI (US); Pete R. Garcia, Troy, MI (US); Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 258 days.

(21) Appl. No.: 14/939,542

(22) Filed: Nov. 12, 2015

(65) Prior Publication Data

US 2017/0136870 A1    May 18, 2017

(51) Int. Cl.
*B60K 6/52*    (2007.10)
*B60K 6/365*    (2007.10)
*B60K 6/387*    (2007.10)
*B60K 6/442*    (2007.10)
*F16H 3/72*    (2006.01)
(Continued)

(52) U.S. Cl.
CPC ............... *B60K 6/52* (2013.01); *B60K 6/365* (2013.01); *B60K 6/387* (2013.01); *B60K 6/442* (2013.01); *F16H 3/725* (2013.01); *F16H 37/02* (2013.01); *B60K 2006/381* (2013.01); *B60Y 2200/92* (2013.01); *B60Y 2400/73* (2013.01); *B60Y 2400/82* (2013.01); *F16H 2200/201* (2013.01); *F16H 2200/2007* (2013.01); *F16H 2200/2097* (2013.01); *Y02T 10/6234* (2013.01); *Y02T 10/6265* (2013.01); *Y10S 903/911* (2013.01); *Y10S 903/914* (2013.01); *Y10S 903/916* (2013.01)

(58) Field of Classification Search
CPC .......... B60K 6/52; B60K 6/387; B60K 6/442; B60K 6/365; B60K 2006/381; F16H 3/725; F16H 37/02; F16H 2200/2097; F16H 2200/2007; F16H 2200/201
See application file for complete search history.

(56) References Cited

U.S. PATENT DOCUMENTS 9,114,804 B1 * 8/2015 Shukla ................. B60W 20/10
2004/0176203 A1 * 9/2004 Supina ................. B60K 6/365
475/8

(Continued)

*Primary Examiner* — David J Hlavka
(74) *Attorney, Agent, or Firm* — Quin IP Law

(57) ABSTRACT

A powertrain includes an output member, and first and second simple planetary gear sets. The planetary gear sets each have a first, a second, and a third member including a sun gear, carrier, and ring gear member. The drive unit includes a single electric machine operable as a motor and having a rotor connected to rotate in unison with and drive the sun gear member of the first planetary gear set. An interconnecting member connects the second member of the first planetary gear set to rotate in unison with the first member of the second planetary gear set. The third member of the first planetary gear set or the second member of the second planetary gear set is continuously grounded to the stationary member or operatively connected to be driven by an engine. The third member of the second planetary gear set is continuously operatively connected to the output member.

7 Claims, 13 Drawing Sheets

(51) Int. Cl.
*F16H 37/02* (2006.01)
*B60K 6/38* (2007.10)

(56) References Cited

U.S. PATENT DOCUMENTS

| | | | |
|---|---|---|---|
| 2009/0182474 A1* | 7/2009 | Ross | B60K 6/52 |
| | | | 701/53 |
| 2009/0197727 A1* | 8/2009 | Janson | B60K 6/365 |
| | | | 475/5 |
| 2013/0116077 A1* | 5/2013 | Tamai | B60K 6/365 |
| | | | 475/5 |
| 2013/0252773 A1* | 9/2013 | Suntharalingam | B60K 6/387 |
| | | | 475/5 |
| 2015/0330481 A1* | 11/2015 | Griesmeier | F16H 3/725 |
| | | | 475/5 |
| 2015/0375611 A1* | 12/2015 | Smetana | B60K 6/48 |
| | | | 475/5 |

* cited by examiner

POWERTRAIN WITH MULTI-PLANETARY, SINGLE MOTOR DRIVE UNIT

TECHNICAL FIELD

The present teachings generally include a powertrain with an electric drive unit.

BACKGROUND

Hybrid powertrains for vehicles utilize different power sources under different vehicle operating conditions. An electro-mechanical hybrid powertrain typically has an internal combustion engine, such as a diesel or gasoline engine, and one or more motor/generators. Different operating modes, such as an engine-only operating mode, an electric-only operating mode, and a hybrid operating mode are established by engaging brakes and/or clutches in different combinations and controlling the engine and motor/generators. The various operating modes are advantageous, as they may be used to improve fuel economy. However, the additional components required for a hybrid powertrain, such as the motor/generators, brakes and/or clutches, may increase overall vehicle cost and packaging space requirements.

SUMMARY

Various embodiments of multi-planetary, single motor drive units are provided that are relatively compact and can be arranged to drive an axle as a single axis electric drive axle, or arranged with an engine or other power source to drive an axle as a multi axis power-split drive axle arrangement. The drive unit may be an all-electric or electric-only drive having only the single electric machine as a power source, and may be referred to as an electric axle. Additionally or alternatively, a power-split drive axle arrangement can be used on one axle of a vehicle, such as a front axle, and an electric drive axle can be used on a second axle, such as a rear axle, to create an all-wheel drive arrangement. The drive units can be configured as modules, with a first module used on the input-split drive axle, and a substantially identical second module used on the electric drive axle. The modularity can achieve economies of scale in production. As the drive units utilize planetary gearing arrangements, they are more compact than other gearing arrangements, such as three-axis arrangements.

A powertrain may comprise a drive unit that includes an output member, a first planetary gear set, and a second planetary gear set. Each of the first and the second planetary gear sets are simple planetary gear sets having a first member, a second member, and a third member including a sun gear member, a carrier member, and a ring gear member. The drive unit includes a single electric machine operable as a motor and having a rotor connected to rotate in unison with and drive the sun gear member of the first planetary gear set. An interconnecting member connects the second member of the first planetary gear set to rotate in unison with the first member of the second planetary gear set. One of the third member of the first planetary gear set and the second member of the second planetary gear set is continuously grounded to the stationary member or is operatively connected to be driven by an engine (e.g., in a drive unit arranged in an input-split arrangement). The third member of the second planetary gear set is continuously operatively connected to the output member. Various embodiments may include an additional brake, a clutch, and/or a third planetary gear set.

When used as modules with one drive unit on a first axle of a vehicle arranged in operative connection with an engine, and another drive unit on a second axle of the vehicle, various operating modes including all-wheel drive operating modes may be provided depending on the specific configuration of the electric drive unit used.

The above features and advantages and other features and advantages of the present teachings are readily apparent from the following detailed description of the best modes for carrying out the present teachings when taken in connection with the accompanying drawings.

DETAILED DESCRIPTION

Figure 1:
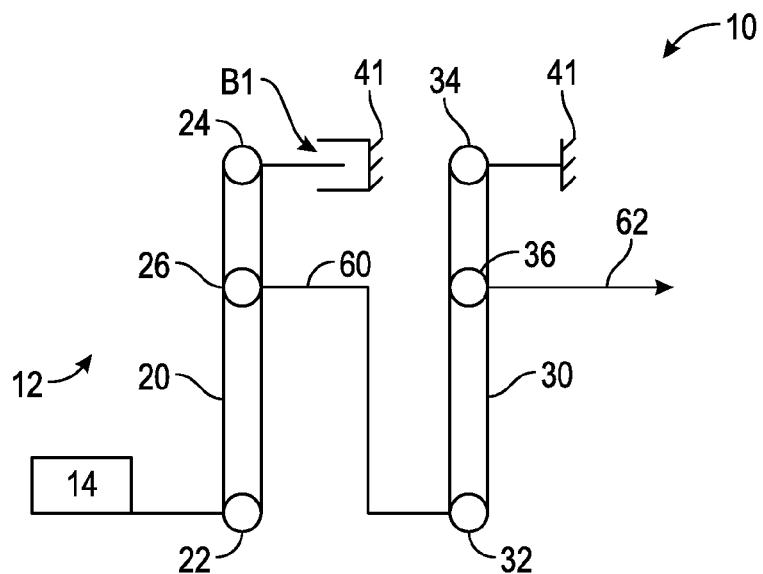
FIG. 1 is a schematic illustration in lever diagram form of a powertrain with an electric drive unit.

Referring to the drawings, wherein like reference numbers refer to like components throughout the views, FIG. 1 shows a powertrain 10 such as for a vehicle. The powertrain 10 includes an electric drive unit 12. The electric drive unit 12 includes only a single electric machine 14 that is configured to operate as a motor, and may also be configured to operate as a generator.

Figure 2:
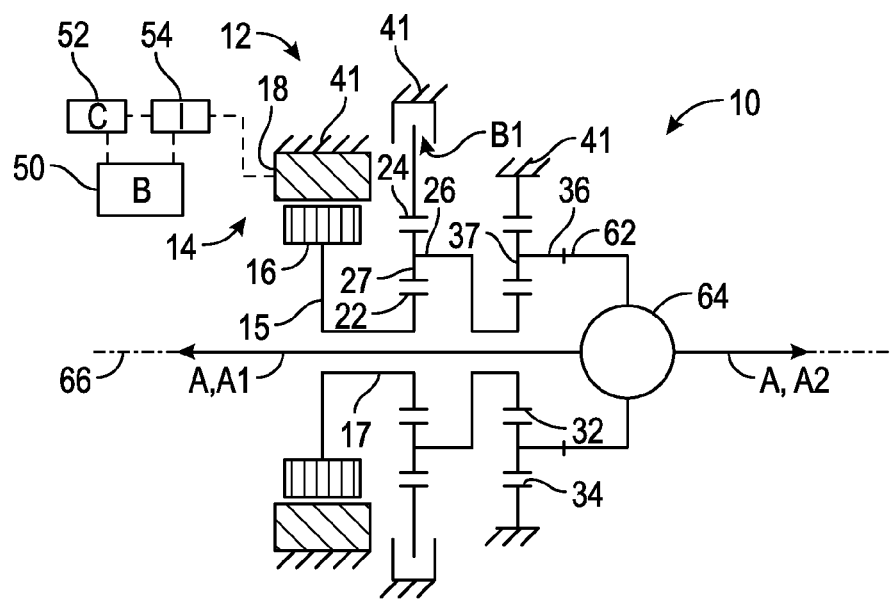
FIG. 2 is a schematic illustration in stick diagram form of the powertrain of FIG. 1 including a control system.

The electric drive unit 12 further includes a first planetary gear set 20 and a second planetary gear set 30 represented in lever form in FIG. 1. The first and second planetary gear sets 20 and 30 are simple planetary gear sets. The planetary gear set 20 has a first member 22, a second member 26, and a third member 24 including a sun gear member, a ring gear member and a carrier member. For example, in the embodiment shown in FIG. 2, the first member 22 is a sun gear member, the second member 26 is a carrier member, and the third member 24 is a ring gear member. With reference to FIG. 2, a plurality of pinion gears 27 are rotatably supported on the carrier member 26 and mesh with both the first member (sun gear member 22) and the third member (ring gear member 34).

The second planetary gear set 30 includes a first member 32, a second member 34 and a third member 36. In the embodiment shown in FIG. 2, the first member 32 is a sun gear member, the second member 34 is a ring gear member, and the third member 36 is a carrier member. With reference to FIG. 2, a plurality of pinion gears 37 are rotatably supported on the carrier member 36 and mesh with both the first member (sun gear member 32) and the second member (ring gear member 34).

The electric machine 14 is shown in greater detail in FIG. 2. The electric machine 14 has a rotor 16 connected to rotate in unison with and drive the sun gear member 22 of the first planetary gear set 20 via a rotor hub 15 and sleeve shaft 17. The electric machine 14 also includes a stator 18 that radially surrounds the rotor 16 and is grounded to a stationary member 41 such as a motor housing of the first electric machine 14 or to a different stationary member.

The stator 18 of the electric machine 14 has electrical windings operatively connected to an energy storage device 50 that may be one or more batteries, labeled B in FIG. 2. Other electric storage devices that have the ability to store electric power and dispense electric power may be used in place of the batteries. A controller 52, labeled C in FIG. 2, is operatively connected to the electric machine 14 and monitors the speed of the rotor 16. The controller 52 also receives information regarding other vehicle operating conditions, such as driver accelerator commands, and is operable to provide electrical energy from the energy storage device 50 through a power inverter 54, labeled I in FIG. 2, to the electric machine 14 to cause the electric machine 14 to function as a motor, adding torque to the sun gear member 22. The power inverter 54 converts direct current of the energy storage device 50 to alternating current when electrical power is provided to the electric machine 14. The energy storage device 50, controller 52, and power inverter 54 are not shown in FIG. 1.

If the information received by the controller 52 indicates that the electric machine 14 should be operated as a generator, converting mechanical energy into electrical energy, the controller 52 is operable to cause the power inverter 54 to convert alternating current provided from the electric machine 14 into direct current stored in the energy storage device 50. The lines in FIG. 2 connecting the electric machine 14, the energy storage device 50, the controller 52, the inverter 54, and stator windings of the stator 18 represent transfer conductors for relaying electrical current or signals between the components.

The electric drive unit 12 also includes an interconnecting member 60 that connects the second member 26 of the first planetary gear set 20 to rotate in unison with the first member 32 of the second planetary gear set 30. As used herein, an "interconnecting member" may be a single rigid rotatable component, such as a shaft, or may have one or more interconnected portions, such as hub and shaft portions, that rotate together in unison. The second member 34 of the second planetary gear set 30 is continuously grounded to the stationary member 41, which may be the same stationary member to which the stator 18 is grounded, or a different stationary member. Stationary members are referred to with the reference number 41 herein, and may represent the same or different stationary members within a given embodiment. As used herein, a "stationary member" means a member that is fixed so that it is not rotatable during operation of the powertrain. The electric drive unit 12 also has an output member 62. The third member 36 of the second planetary gear set 30 is continuously operatively connected to the output member 62. As used herein, a member is "continuously operatively connected" to another member when no selectively engageable clutches or brakes need be engaged in order for the members to be connected to and rotate in unison with one another. As used herein, two components "rotate in unison" when they are operatively connected to one another such that they rotate together at the same speed, including at zero speed (i.e., when they are stationary together).

The output member 62 drives a differential 64 that is configured to distribute torque to a drive axle A. The drive axle A includes two separate axle portions, referred to as a first half shaft A1 and a second half shaft A2 although they may be of different lengths. The differential 64 establishes that the speed of the axle A is the average of the speeds of its two separate half shafts A1, A2. A wheel, not shown in FIG. 2, is connected to and rotatable on each half shaft A1, A2. The half shafts A1, A2 extend along and are rotatable about an axis of rotation 66. The output member 62, electric machine 14, and the planetary gear sets 20, 30 are concentric with the half shafts A1, A2 about the axis of rotation 66 and the output member 62 is operatively connected to the half shafts A1, A2 so that the electric machine 14 drives the half shafts A1, A2 through the planetary gear sets 20, 30.

A first brake B1 is selectively engageable to ground the third member 24 of the first planetary gear set 20 to the stationary member 41. The second member 34 of the third planetary gear set 30 is continuously grounded to the stationary member 41. Accordingly, the ring gear member 34 is continuously stationary. The ring gear member 24 is selectively stationary when the brake B1 is engaged when a control signal is received from the controller 52 or from a different controller not shown but operatively connected to the controller 52 in accordance with predetermined vehicle operating conditions. The powertrain 10 is referred to as a neutral brake at input gear set powertrain. When the brake B1 is not engaged, the powertrain 10 is in a neutral state. When the brake B1 is engaged, the powertrain 10 is in a drive state if the electric machine 14 is operated as a motor to drive the axle A through the planetary gear sets 20, 30, or operated as a generator to slow the axle A. The transition from the neutral state to the drive state can be synchronized by the controller 52 controlling the speed of the electric machine 14 so that the rotor 16 causes the ring gear member 24 to slow to zero speed, taking into account the speed of the carrier member 26 as affected by the speed of the axle A (which may be stationary or may be rotating). Alternatively, the engagement or disengagement of the brake B1 may be a "power shift" between the neutral state and the drive state. As used herein, a "power shift" means that the brake or clutch being engaged (here the brake B1) experiences slip and bears torque during engagement. For example, the ring gear member 24 is not at zero speed at the time of engagement of the brake B1 during a power shift. For example, if the brake B1 is a well-controlled energy clutch or a selectable one-way clutch, the engagement of the brake B1 may be a power shift.

Figure 3:
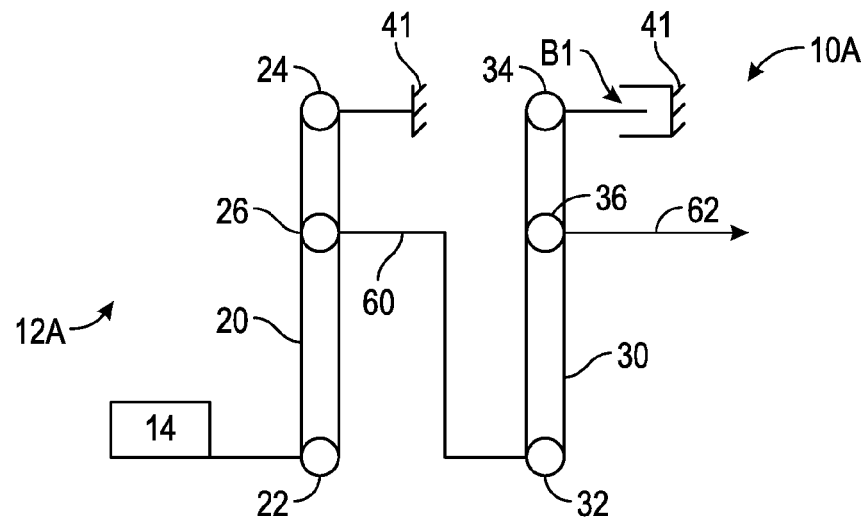
FIG. 3 is a schematic illustration in lever diagram form of a powertrain with an electric drive unit in accordance with an alternative aspect of the present teachings.
Figure 4:
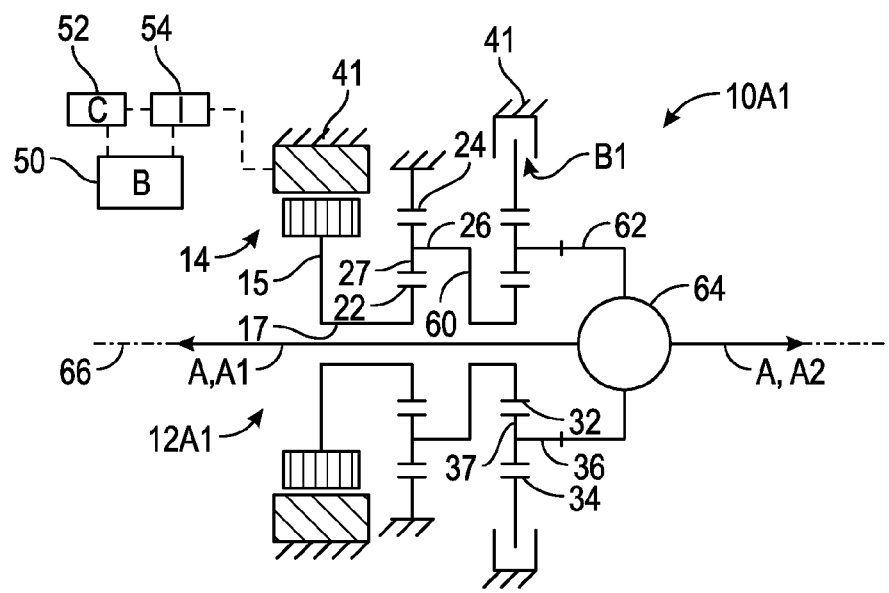
FIG. 4 is a schematic illustration in stick diagram form of the powertrain of FIG. 3 including a control system.

FIG. 3 depicts an alternative embodiment of a powertrain 10A with an electric drive unit 12A. The powertrain 10A has many of the same components as the powertrain 10. The first brake B1 is selectively engageable to ground the second member 34 of the second planetary gear set 30 to a stationary member 41. The third member 34 of the first planetary gear set 20 is continuously grounded to the stationary member 41. FIG. 4 is a powertrain 10A1 with an electric drive unit 12A1 and is one specific embodiment of the powertrain 10A and electric drive unit 12A of FIG. 3. The powertrain 10A is referred to as a neutral brake at output gear set powertrain.

Figure 5:
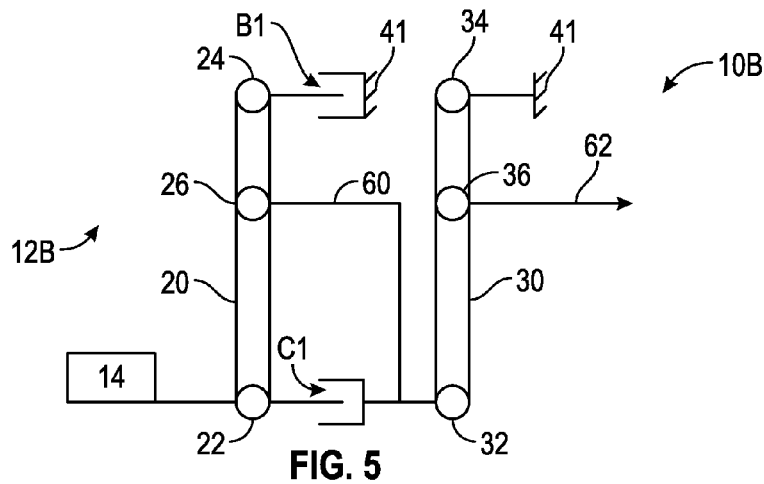
FIG. 5 is a schematic illustration in lever diagram form of a powertrain with an electric drive unit in accordance with an alternative aspect of the present teachings.

FIG. 5 depicts an alternative embodiment of a powertrain 10B with an electric drive unit 12B. The powertrain 10B has many of the same components as the powertrain 10. The first brake B1 is selectively engageable to ground the third member 24 of the first planetary gear set 20 to stationary member 41. The third member 34 of the second planetary gear set 30 is continuously grounded to the stationary member 41. A clutch C1 is selectively engageable to connect the first member 22 of the first planetary gear set 20 (e.g., the sun gear member 22) to rotate in unison with the first member 32 of the second planetary gear set 30 (e.g., the sun gear member 32).

Figure 6:
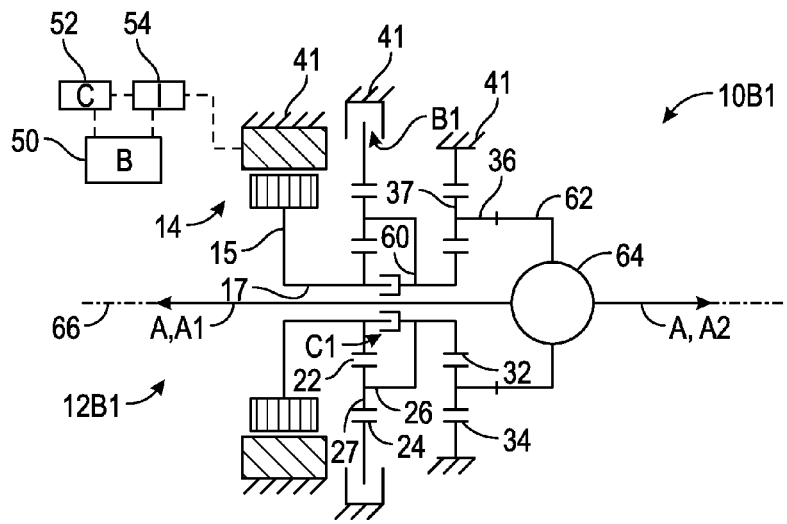
FIG. 6 is a schematic illustration in stick diagram form of one embodiment of the powertrain of FIG. 5 including a control system.
Figure 7:
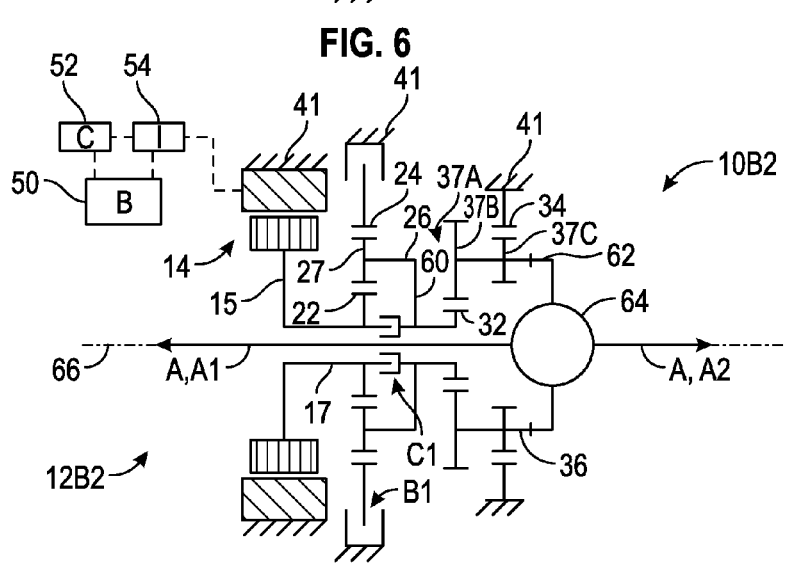
FIG. 7 is a schematic illustration in stick diagram form of another embodiment of the powertrain of FIG. 5 including a control system.

FIG. 6 depicts a first embodiment 10B1 of the powertrain 10B with an electric drive unit 12B1 that is a first embodiment of the electric drive unit 12B of FIG. 5. The carrier member 36 of the second planetary gear set 30 rotatably supports a first set of pinion gears 37. FIG. 7 depicts a second embodiment 10B2 of the powertrain 10B with an electric drive unit 12B2 that is a second embodiment of the electric drive unit 12B of FIG. 5. The carrier member 36 rotatably supports a first set of stepped pinion gears 37A. The stepped pinion gears 37A have a first portion 37B with a relatively large diameter gear, and a second portion 37C with a relatively small diameter gear. In other words, the second portion 37C has a smaller diameter than the first portion 37B. The stepped pinion gears 37A enable greater torque multiplication from the sun gear member 32 to the carrier member 36 than the pinion gears 37.

Embodiments described herein having only a single brake and a single clutch, such as brake B1 and clutch C1 in FIG. 5, may be referred to as two-speed P4 embodiments or as two-speed electric axles. For example, the powertrain 10B may be used in two different speed ratios to drive the axle A using only electric power from the electric machine 14. A first gear is established (i.e., a first electric-only mode) when the electric machine 14 is controlled to operate as a motor and only the brake B1 is engaged, a neutral state is established when neither the brake B1 nor the clutch C1 is engaged, and a second gear is established (i.e., a second electric-only mode) when the electric machine 14 is controlled to operate as a motor and only the clutch C1 is engaged. In the first gear, both planetary gear sets 20, 30 are active to reduce speed and increase torque. In the neutral gear, there is no torque transfer from the electric machine 14 to the output member 62. In the second gear, the first planetary gear set 20 is inactive as it is locked to rotate as the same speed as the rotor of the electric machine 14. Accordingly, in the second gear, only the second planetary gear set 30 is active to increase torque and reduce speed. The speed at the output member 62 is higher for a given speed of the electric machine 14 in the second gear than in the first gear. The first gear may therefore be referred to as a low gear, and the second gear may be referred to as a high gear.

The transition from the first gear to the second gear can be synchronized through the neutral state (i.e., changes in speed of the electric machine 14 to bring the carrier member 26 to the same speed as the sun gear member 22) by interrupting power to the output member 62 when neither the brake B1 nor the clutch C1 is engaged. Alternatively, the shift from the first gear to the second gear may be a power shift (in which the brake B1 may be released and the clutch C1 may be engaged simultaneously), and/or the clutch C1 may be engaged while there is a speed differential between the carrier member 26 and the sun gear member 22. For a power shift, the clutch C1 should be an energy clutch (i.e., a clutch capable of handling and absorbing slip) and the brake B1 should be an energy clutch or a selectable one-way clutch.

Figure 8:
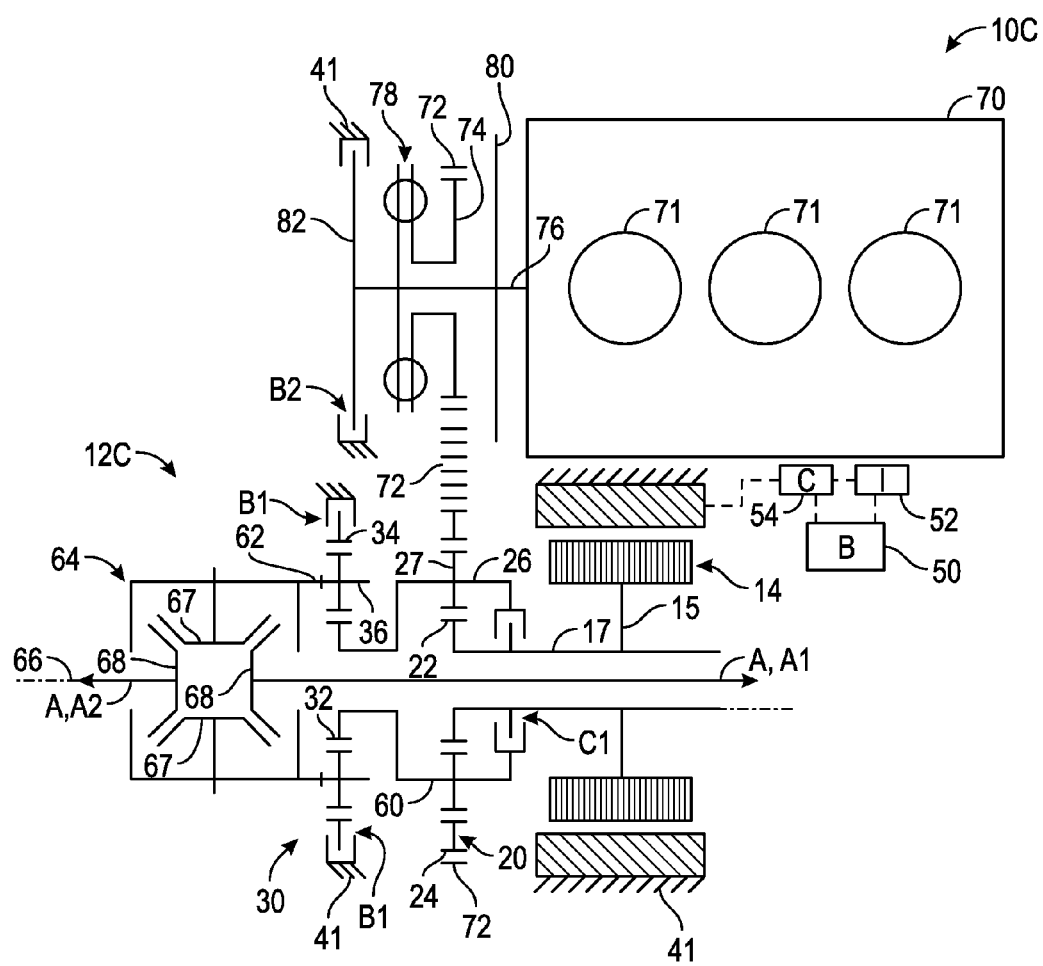
FIG. 8 is a schematic illustration in stick diagram form of a powertrain including an electric drive unit, a control system, and an engine operatively connected to the electric drive unit.

FIG. 8 depicts a powertrain 10C that has an electric drive unit 12C with many of the same components as the powertrain 10 and the electric drive unit 12. The first brake B1 is selectively engageable to ground the second member 34 of the second planetary gear set 30 to the stationary member 41. The clutch C1 is selectively engageable to connect the sun gear member 22 of the first planetary gear set 20 to the carrier member 26 and to the sun gear member 32 of the second planetary gear set 30 via the interconnecting member 60. The differential 64 is shown in greater detail in FIG. 8. Pinion gears 67 mesh with side gears 68 disposed for rotation with the first and second axle portions A1, A2.

The third member of the first planetary gear set 20, i.e., the ring gear member 24, is operatively connected to be driven by an engine 70. The engine 70 is shown schematically with multiple cylinders 71, and may have 2, 3, 4, 6, 8, or another number of cylinders 71 in any arrangement. More specifically, the ring gear member 24 is connected by a chain 72 to an external gear, such as a ring gear 74, that is connected to rotate with a crankshaft 76 of the engine 70. A torsional damper 78 and a fly wheel 80 also rotate with the crankshaft 76. A hub 82 on the crankshaft 76 is selectively grounded to the stationary member 41 by a second brake B2 to hold the crankshaft 76 stationary, and thereby hold the ring gear member 24 stationary.

Figure 22:
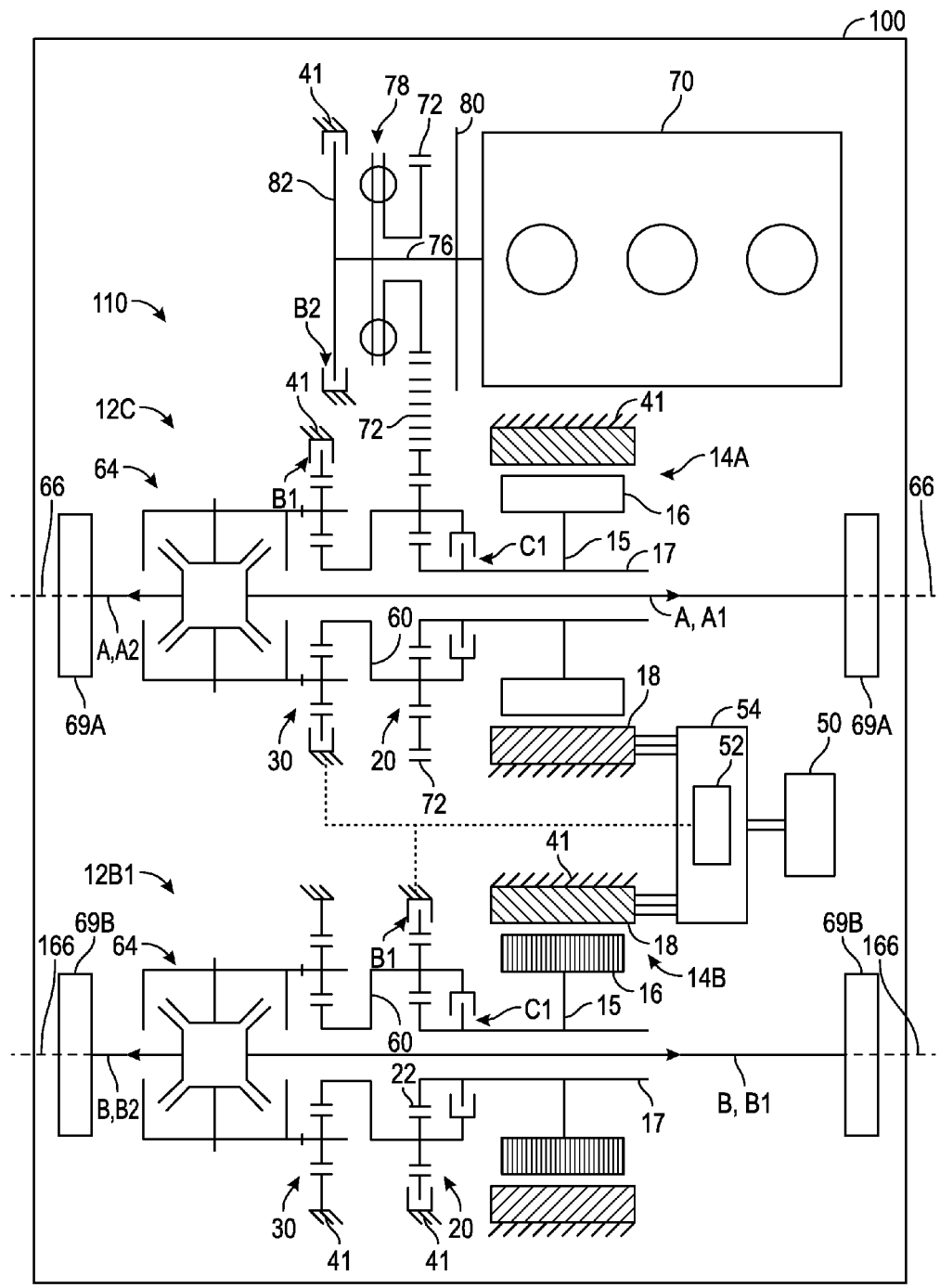
FIG. 22 is a schematic illustration of a vehicle having the powertrain of FIG. 8 operable to drive a first axle and a separate electric drive unit operable to drive a second axle.

The electric drive unit 12C is arranged in an input-split arrangement with an engine 70 in FIG. 8. In FIG. 22, the drive unit 12C of FIG. 8 and the drive unit 12B1 of FIG. 6 are combined in an all-wheel drive powertrain 110 of a vehicle 100. The powertrain 110 includes the first drive unit 12C arranged concentrically about and driving a first axle A, shown as the front axle in an input-split arrangement. The drive unit 12B1 is arranged concentrically about and drives a second axle B, shown as the rear axle, as an electric-drive axle, about an axis of rotation 166. The second axle B has first and second half shafts B1, B2 extending from a differential 64 identical to the differential 64 of FIG. 5 in place of the half shafts A1, A2. Front wheels 69A are driven on the front axle A and rear wheels 69B are driven on the rear axle B. In the first drive unit 12C, the electric machine is referred to as 14A, and in the second drive unit 12B1, the electric machine is referred to as 14B. The controller 52 and inverter 54 are shown arranged as a motor-controller power-inverter module connected to the stators 18 of both electric machines 14A, 14B. Two individual sets of controllers 52 and inverters 54 may also be utilized. The controller 52 is also operatively connected to the brake B1 of each drive unit 12B1, 12C, as shown with dotted connection, and to the brake B2 of the drive unit 12C (connection not shown for clarity in the drawings). Optionally, the motor-controller power-inverter module may further include a boost converter to step up (i.e., boost) direct current voltage provided from the energy storage device 50 from a first level to a higher second level.

The drive units 12B and 12C used in the powertrain 110 share most of their parts in common and can be produced as modules consisting of all of the common parts. The powertrain 110 can thus be considered modular, having two of the modules, one at each drive axle. Additionally, the drive unit 12C can be used by itself in an electric-only vehicle that does not have an engine, and has only the battery 50 as a power source, or optionally also a fuel cell.

The powertrain 110 can be controlled to function as an input-power split operating mode with the engine 70 on and driving the front axle A, with the electric machine 14A controlled to operate as a motor or as a generator. The electric machine 14B can be operated as a motor to provide an input-split all-wheel drive operating mode with the electric machine 14A and/or the energy storage device 50 providing electrical power to the electric machine 14B. The electric machine 14B can be controlled to function as a motor during the input-power split all-wheel drive operating mode to drive the second axle B using the energy received from the electric machine 14A or from the energy storage device 50. B1 is engaged and B2 is not engaged during the input-power-split operating mode. The electric machine 14B can also be controlled to operate as a motor in an electric-only operating mode with both the engine 70 and the electric machine 14A off so that only the drive axle B is driven. The brake B1 of the electric drive unit 12B1 can be engaged with the engine off in the electric-drive operating mode.

In a starting mode for the engine 70, the output ring brake B1 and the lockup clutch C1 of the drive unit 12C are engaged and the electric machine 14A is operated as a motor to start the engine 70. In a series hybrid operating mode, the output ring brake B1 and the lockup clutch C1 of the drive unit 12C are engaged, the engine 70 is on, and the electric machine 14A is operated as a generator supplying power to the battery 50 and/or to the electric machine 14B which can be operated as a motor to drive the axle B. In a parallel hybrid operating mode, the lockup clutch C1 of the drive unit 12C is engaged, the engine 70 is on, and the electric machine 14A is operated as a motor to drive the axle A in parallel with the engine 70. During this time, the electric machine 14B can be controlled to operate as a motor to drive the second axle B with the brake B1 of the drive unit 12B1 engaged so that the parallel hybrid operating mode is a parallel hybrid all-wheel drive operating mode. Still further, the electric machine 14A can be controlled to operate as a motor with both brakes B1 and B2 of the electric drive unit 12C engaged so that the electric machine 14A alone drives the axle A with the engine 70 off.

Figure 9:
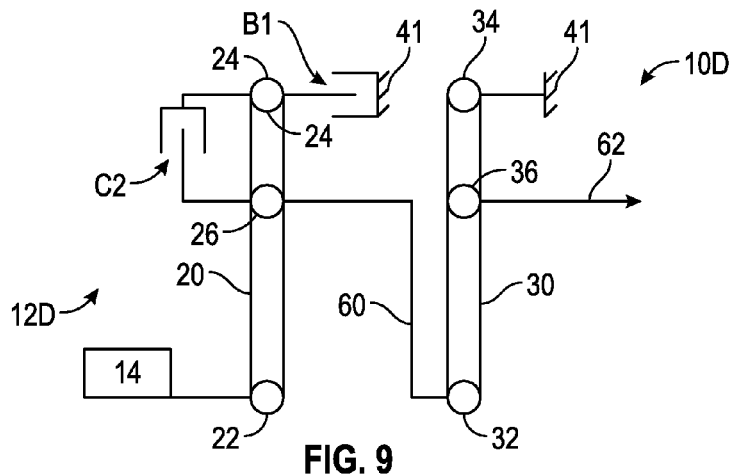
FIG. 9 is a schematic illustration in lever diagram form of a powertrain with an electric drive unit in accordance with an alternative aspect of the present teachings.
Figure 10:
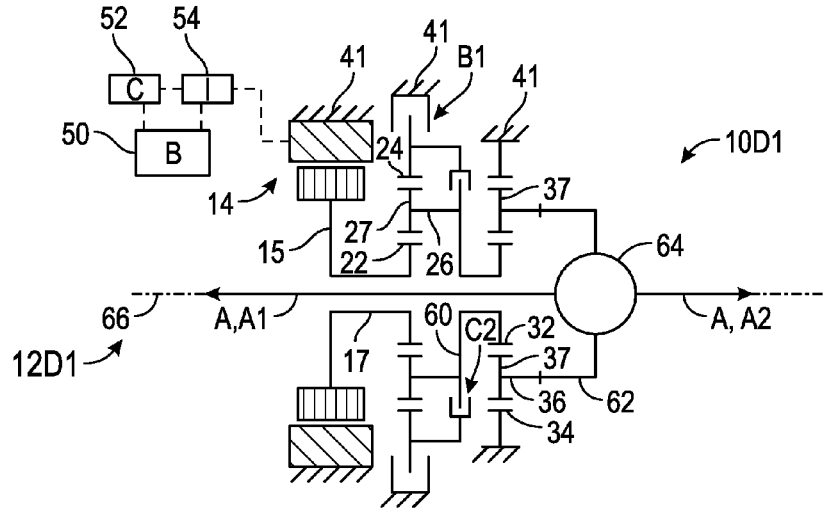
FIG. 10 is a schematic illustration in stick diagram form of an embodiment of the powertrain of FIG. 9 including a control system.
Figure 11:
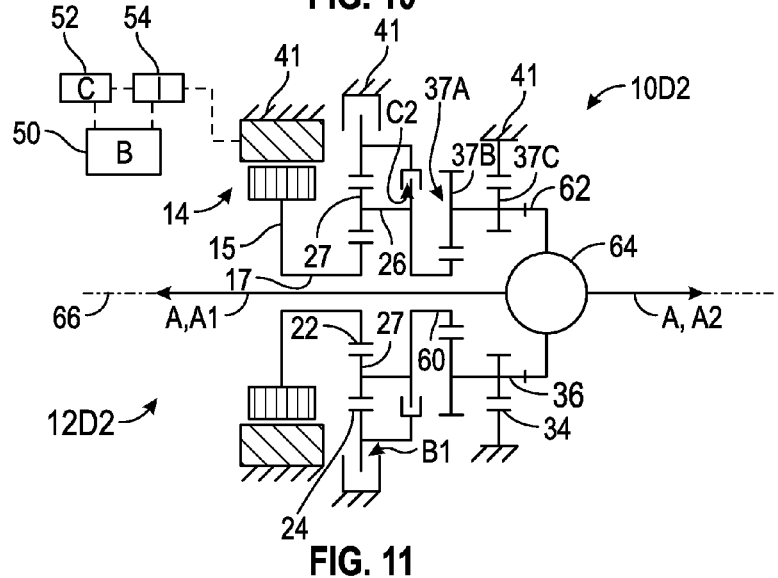
FIG. 11 is a schematic illustration in stick diagram form of another embodiment of the powertrain of FIG. 9 including a control system.

FIG. 9 depicts an alternative embodiment of a powertrain 10D with an electric drive unit 12D that is another two-speed P4 arrangement. The powertrain 10D has the same components as the powertrain 10 of FIG. 1 but adds a clutch C2 that is selectively engageable to connect the second member 26 (e.g., the carrier member) of the first planetary gear set 20 rotate in unison with the third member 24 (e.g., the ring gear member) of the first planetary gear set 20. FIG. 10 depicts a first embodiment 10D1 of the powertrain 10D with an electric drive unit 12D1 that is a first embodiment of the electric drive unit 12D of FIG. 9 in which the carrier member 36 of the second planetary gear set 30 rotatably supports a first set of pinion gears 37. FIG. 11 depicts a second embodiment 10D2 of the powertrain 10B with an electric drive unit 12D2 that is a second embodiment of the electric drive unit 12D of FIG. 9 in which the carrier member 36 rotatably supports a first set of stepped pinion gears 37A. The stepped pinion gears 37A have a first portion 37B with a relatively large diameter gear, and a second portion 37C with a relatively small diameter gear. In other words, the second portion 37C has a smaller diameter than the first portion 37B. The stepped pinion gears 37A enable a greater torque multiplication from the sun gear member 32 to the carrier member 36 than the pinion gears 37.

The powertrain 10D (and its embodiments 10D1, 10D2) is operable in a first gear when the electric machine 14 is controlled to operate as a motor and only the brake B1 is engaged, in a neutral state when neither the brake B1 nor the clutch C2 is engaged, and in a second gear when the electric machine 14 is controlled to operate as a motor and only the clutch C2 is engaged. In the first gear, both planetary gear sets are active to reduce speed and increase torque. In the neutral gear, there is no torque transfer from the electric machine 14 to the output member 62. In the second gear, the first planetary gear set 20 is inactive as it is locked to rotate as the same speed as the rotor of the electric machine 14. Accordingly, in the second gear, only the second planetary gear set 30 is active to increase torque and reduce speed. The speed at the output member 62 is higher for a given speed of the electric machine 14 in the second gear than in the first gear. The first gear may therefore be referred to as a low gear, and the second gear may be referred to as a high gear.

Figure 12:
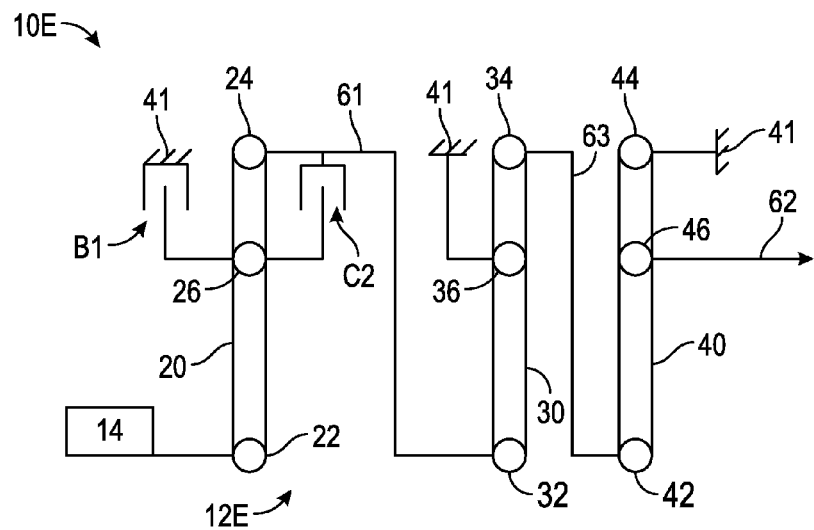
FIG. 12 is a schematic illustration in lever diagram form of a powertrain with an electric drive unit in accordance with an alternative aspect of the present teachings.
Figure 13:
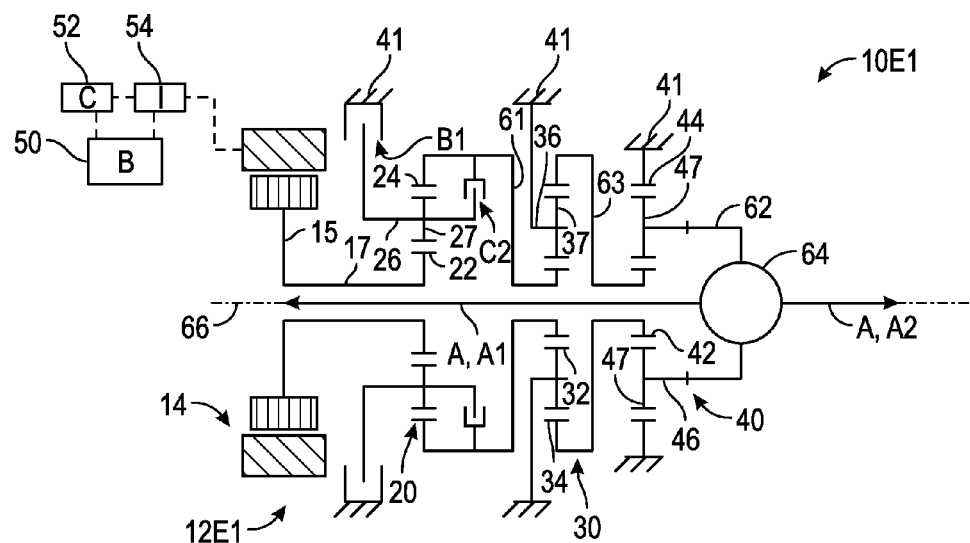
FIG. 13 is a schematic illustration in stick diagram form of an embodiment of the powertrain of FIG. 12 including a control system.

FIG. 12 depicts an alternative embodiment of a powertrain 10E with an electric drive unit 12E that is another two-speed P4 arrangement. FIG. 13 depicts one embodiment 10E1 of the powertrain 10E in stick diagram form with an electric drive unit 12E1 that is a first embodiment of the electric drive unit 12E of FIG. 12. The powertrain 10E has many of the same components as the powertrain 10. The first member of the planetary gear set 20 is the sun gear member 22, the second member is the ring gear member 24, and the third member is the carrier member 26. The first member of the planetary gear set 30 is the sun gear member 32, the second member is the carrier member 36, and the third member is the ring gear member 34. The brake B1 is selectively engageable to ground the carrier member 26 to the stationary member 41.

The clutch C2 is selectively engageable to connect the carrier member 26 to rotate in unison with the ring gear member 24. An interconnecting member 61 is selectively engageable to connect the ring gear member 24 to rotate in unison with the sun gear member 32. Engagement of the clutch C2 causes the entire planetary gear set 20 to rotate at the same speed, and also causes the sun gear member 32 to rotate at that same speed due to the interconnecting member 61. The carrier member 36 is continuously grounded to the stationary member 41.

An additional simple planetary gear set 40 is included in the powertrain 10E. Each of the planetary gear sets 20, 30, 40 and the electric machine 14 are concentric about the axis of rotation 66 shown with respect to the powertrain 10E1 in FIG. 13. The planetary gear set 40 has a first member 42, a second member 46, and a third member 44 including a sun gear member, a carrier member and a ring gear member. For example, in the embodiment shown in FIG. 13, the first member 42 is a sun gear member, the second member 46 is a carrier member, and the third member 44 is a ring gear member. With reference to FIG. 13, a plurality of pinion gears 47 are rotatably supported for rotation by the carrier member 46 and mesh with both the first member (sun gear member 42) and the third member (ring gear member 44). The ring gear member 44 is continuously grounded to the stationary member 41. An additional interconnecting member 63 continuously connects the third member 34 of the second planetary gear set 30 to the first member 42 of the third planetary gear set 40. The output member 62 is continuously connected to the second member (carrier member 46) of the third planetary gear set 40. Because of the interconnecting member 63, the output member 62 is continuously operatively connected to the third member (ring gear member 34) of the second planetary gear set 30 and rotates at a speed established by the third planetary gear set 40 relative to the third member 34.

The powertrain 10E and its embodiment 10E1 is operable in the same states as described with respect to the powertrain 10D: a first gear when the electric machine 14 is controlled to operate as a motor and only the brake B1 is engaged, in a neutral state when neither the brake B1 nor the clutch C2 is engaged, and in a second gear when the electric machine 14 is controlled to operate as a motor and only the clutch C2 is engaged. The addition of the third planetary gear set 40 allows additional speed reduction and torque multiplication between the electric machine 14 and the output member 62 as established by the ratio of the ring gear member 44 to the sun gear member 42 in comparison to an embodiment with only two planetary gear sets.

Figure 14:
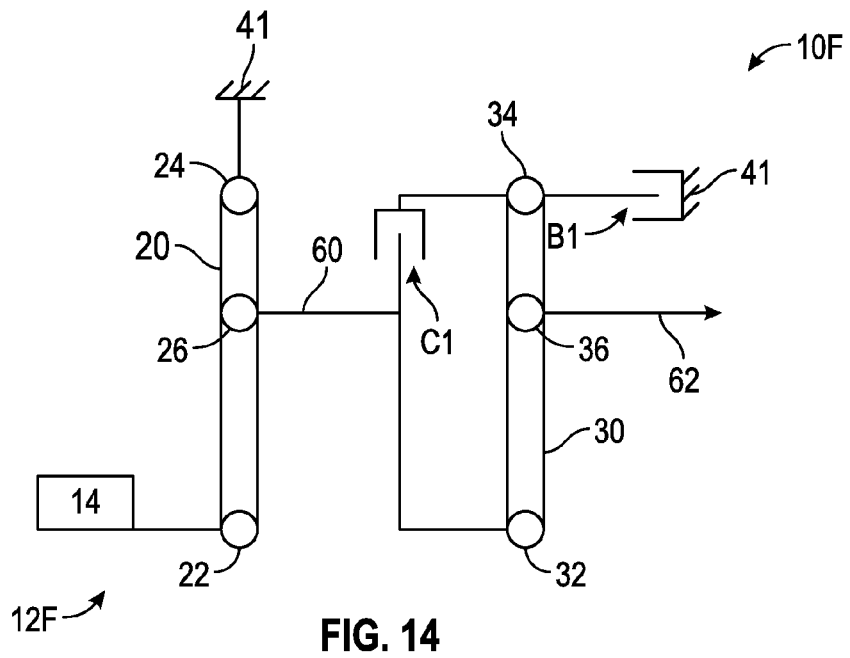
FIG. 14 is a schematic illustration in lever diagram form of a powertrain with an electric drive unit in accordance with an alternative aspect of the present teachings.
Figure 15:
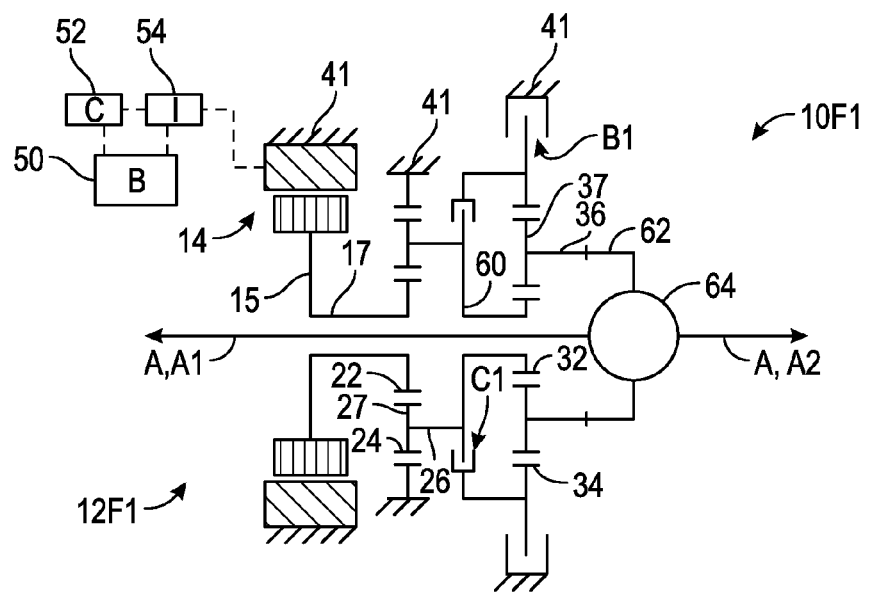
FIG. 15 is a schematic illustration in stick diagram form of an embodiment of the powertrain of FIG. 14 including a control system.

FIG. 14 depicts an alternative embodiment of a powertrain 10F with an electric drive unit 12F that is another two-speed P4 arrangement. FIG. 15 depicts one embodiment 10F1 of the powertrain 10F in stick diagram form with an electric drive unit 12F1 that is a first embodiment of the electric drive unit 12F of FIG. 14. The powertrain 10F has many of the same components as the powertrain 10. The first brake B1 is selectively engageable to ground the second member 34 (i.e., the ring gear member) of the second planetary gear set 30 to a stationary member 41. The third member 24 of the first planetary gear set 20 (i.e., the ring gear member 24) is continuously grounded to the stationary member 41. A clutch C1 is selectively engageable to connect the interconnecting member 60 to rotate in unison with the second member 34 of the second planetary gear set 30 (e.g., the ring gear member 34) and thereby causing the entire planetary gear set 30 and the output member 62 to rotate at the same speed as the carrier member 26. In the first embodiment 10F1 of the powertrain 10F, the carrier member 36 of the second planetary gear set 30 rotatably supports a first set of pinion gears 37.

Figure 16:
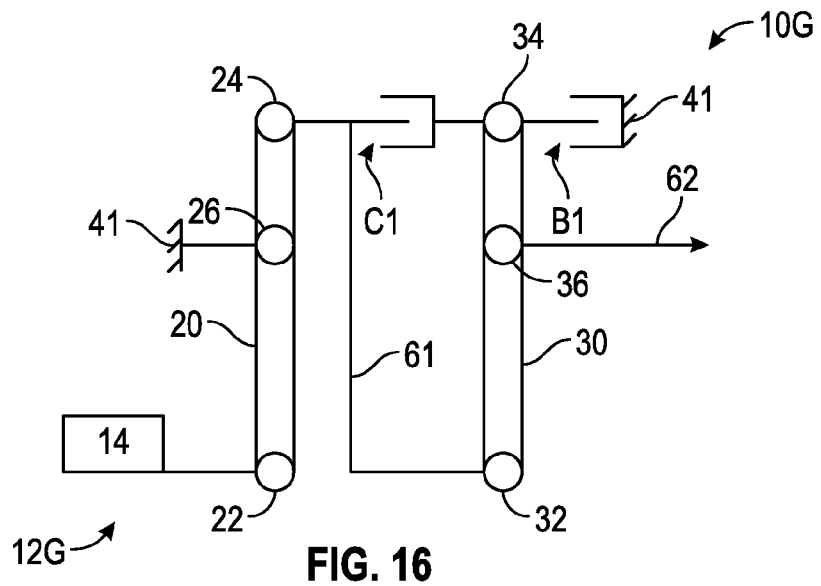
FIG. 16 is a schematic illustration in lever diagram form of a powertrain with an electric drive unit in accordance with an alternative aspect of the present teachings.

FIG. 16 depicts an alternative embodiment of a powertrain 10G with an electric drive unit 12G that is another two-speed P4 arrangement. The powertrain 10G has many of the same components as the powertrain 10. The first member of the planetary gear set 20 is the sun gear member 22, the second member is the ring gear member 24, and the third member is the carrier member 26. The first member of the planetary gear set 30 is the sun gear member 32, the second member is the ring gear member 34, and the third member is the carrier member 36. An interconnecting member 61 continuously connects the ring gear member 24 for rotation in unison with the sun gear member 32. The first brake B1 is selectively engageable to ground the second member 34 (i.e., the ring gear member) of the second planetary gear set 30 to the stationary member 41. The third member 26 of the first planetary gear set 20 (i.e., the carrier member 36) is continuously grounded to the stationary member 41. A clutch C1 is selectively engageable to connect the interconnecting member 61 to rotate in unison with the second member of the second planetary gear set 30 (e.g., the ring gear member 34) and thereby cause the entire planetary gear set 30 and the output member 62 to rotate at the same speed as the ring member 24.

The first planetary gear set 20 is a fixed ratio gear set as the carrier member 26 is continuously grounded. With the carrier member 26 grounded, centrifugal force on pinion gears rotatably supported by the carrier member 26 (identical to pinion gears 27 shown in FIG. 2) is eliminated.

Figure 17:
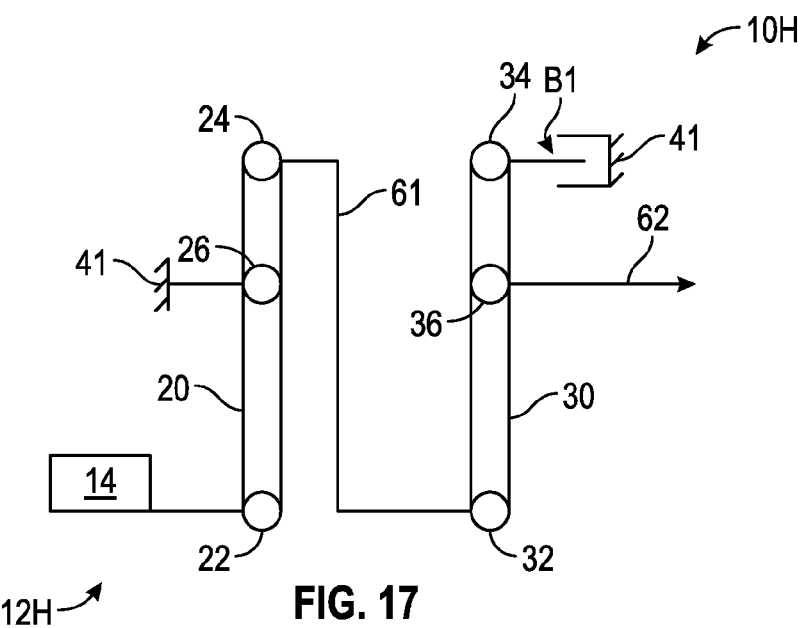
FIG. 17 is a schematic illustration in lever diagram form of a powertrain with an electric drive unit in accordance with an alternative aspect of the present teachings.

FIG. 17 depicts an alternative embodiment of a powertrain 10H with an electric drive unit 12H that is another two-speed P4 arrangement. The powertrain 10H has many of the same components as the powertrain 10G of FIG. 16, except that the clutch C1 is eliminated. The powertrain 10H is thus not a two-speed arrangement, but has a neutral brake at the output gear set (i.e., planetary gear set 30). In other words, the electric drive unit 12H is in a neutral state when the brake B1 is not engaged, and provides torque transfer from the electric machine 14 to the output member 62 at a speed ratio established by the ring gear member to sun gear member tooth ratios of both of the first and second planetary gear sets 20, 30. As described with respect to the embodiment of FIG. 2, the transition from the neutral state to the drive state can be synchronized by the controller 52 controlling the speed of the electric machine 14 so that the rotor 16 causes the ring gear member 34 to slow to zero speed, taking into account the speed of the carrier member 36 (which may be stationary or may be rotating. Alternatively, the engagement or disengagement of the brake B1 may be a "power shift" between the neutral state and the drive state, meaning that the ring gear member 34 is not at zero speed at the time of engagement of the brake B1. For example, if the brake B1 is a well-controlled energy clutch or a selectable one-way clutch, the engagement of the brake B1 may be a power shift.

Figure 18:
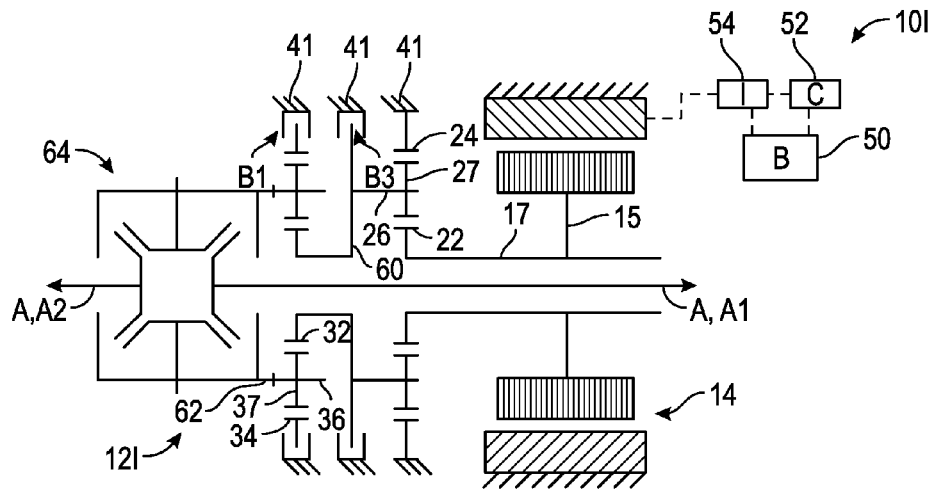
FIG. 18 is a schematic illustration in stick diagram form of an embodiment of a powertrain with an electric drive unit and including a control system in accordance with an alternative aspect of the present teachings.

FIG. 18 depicts an alternative embodiment of a powertrain 10I with an electric drive unit 12I that is another two-speed P4 arrangement. The powertrain 10I has many of the same components as the powertrain 10A of FIGS. 3 and 10A1 of FIG. 4, except that an additional selectively engageable brake B3 is added to selectively ground the interconnecting member 60 and thereby the carrier member 26 and the sun gear member 32 to the stationary member 41. The brake B3 can be engaged to prevent rotation of the electric machine 14 and, when the brake B1 is also engaged, prevent rotation of the axle A (i.e., provide a parking brake).

Figure 19:
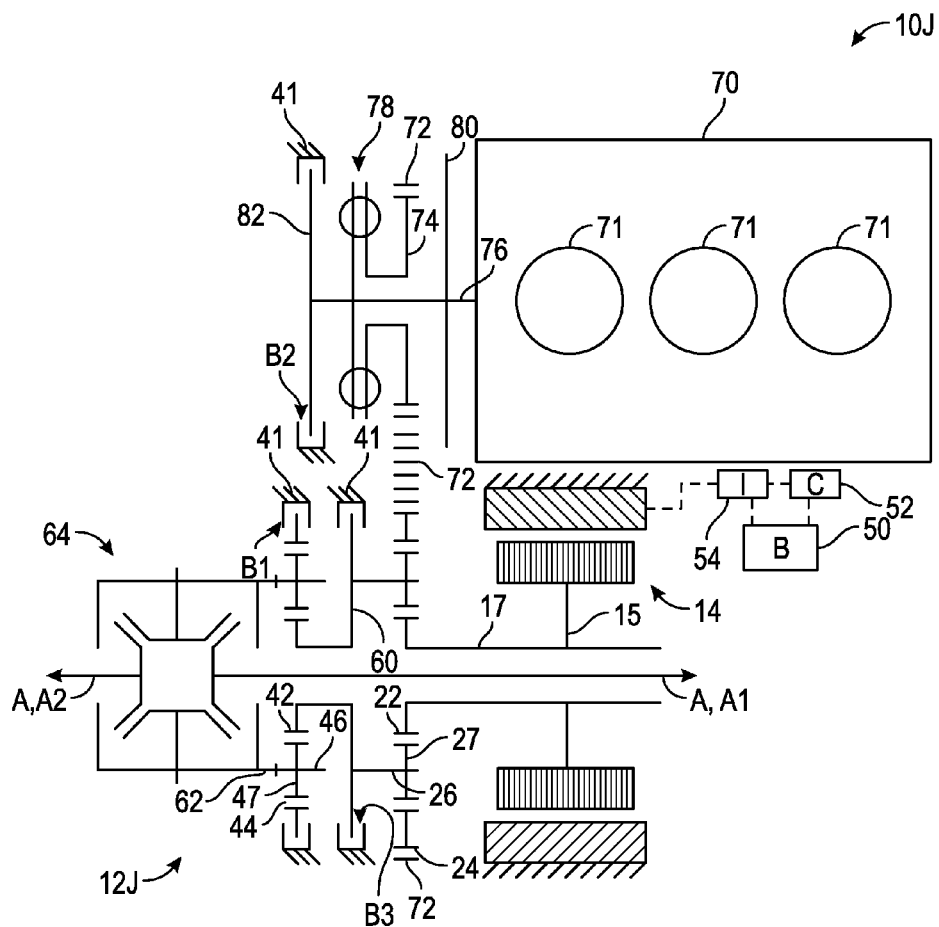
FIG. 19 is a schematic illustration in stick diagram form of a powertrain including an electric drive unit, a control system, and an engine operatively connected to the electric drive unit in accordance with an alternative aspect of the present teachings.

FIG. 19 depicts a powertrain 10J with an electric drive unit 12J similar to the electric drive unit 12I of FIG. 18 but with the third member 24 of the first planetary gear set 20 operatively connected to the driven by an engine 70 in an input-split arrangement as discussed with respect to FIG. 8.

Figure 23:
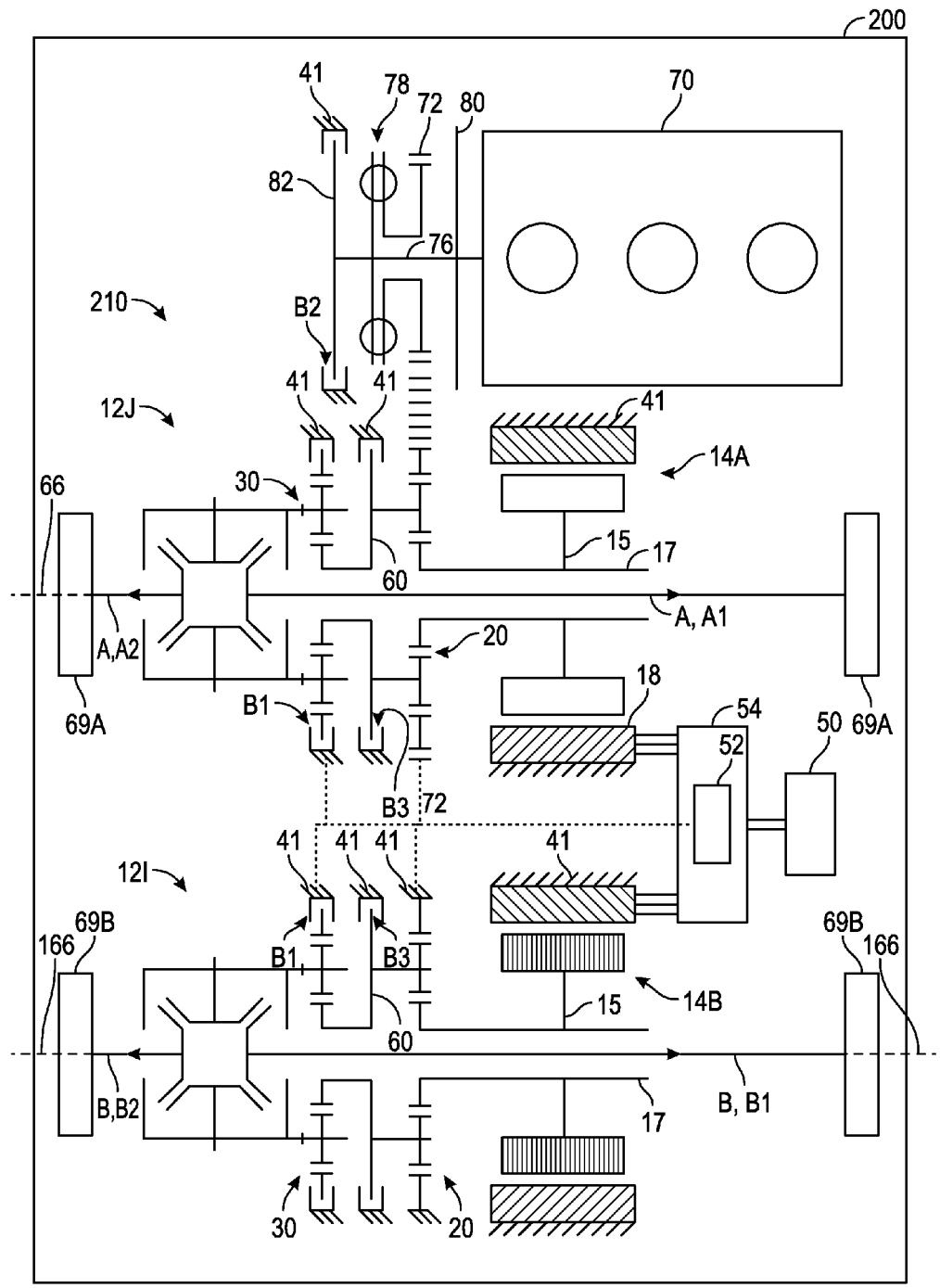
FIG. 23 is a schematic illustration of a vehicle having the powertrain of FIG. 19 operable to drive a first axle and the electric drive unit of FIG. 18 operable to drive a second axle.

In FIG. 23, the drive units 12I and 12J are combined in an all-wheel drive powertrain 210 of a vehicle 200. The powertrain 210 includes the first drive unit 12J arranged concentrically about and driving a first axle A, shown as the front axle. The drive unit 10I is arranged concentrically about and drives a second axle B, shown as the rear axle. The electric machine of the drive unit 12J is referred to as 14A and the electric machine of the drive unit 12I is referred to as 14B as discussed with respect to FIG. 22. The drive units 12I and 12J used in the powertrain 110 share most of their parts in common and can be produced as modules consisting of all of the common parts. The powertrain 210 can thus be considered modular, having two of the modules, one at each drive axle. Additionally, the drive unit 12I can be used by itself in an electric-only vehicle that does not have an engine, and has only the battery 50 as a power source and optionally also a fuel cell.

The powertrain 210 can be controlled to function as an input-power split operating mode with the engine 70 on and driving the front axle A, with the electric machine 14A controlled to operate as a motor or as a generator. The electric machine 14B can be operated as a motor to provide an input-split all-wheel drive operating mode with the electric machine 14A and/or the energy storage device 50 providing power to the electric machine 14B. Both brakes B1 are engaged, and B2 and B3 are not engaged during the input-power-split all-wheel drive operating mode. The electric machine 14B can also be controlled to operate as a motor in an electric-only operating mode with both the engine 70 and the electric machine 14A off so that only the drive axle B is driven and with the brake B1 of the electric drive module 12I engaged. The brake B2 can be engaged with the engine 70 off and the brake B1 of the electric drive unit 12J also engaged with the electric machine 14A operated as a motor in the electric-drive operating mode.

In a starting mode for the engine 70, the carrier brake B3 of the drive unit 12J is engaged and the electric machine 14A is operated as a motor to start the engine 70. In a series hybrid operating mode, the brake B1 is not engaged and the brake B3 of the drive unit 12J is engaged, the engine 70 is on, and the electric machine 14A is operated as a generator supplying power to the battery 50 and/or to the electric machine 14B which can be operated as a motor to drive the axle B or can be off if power is supplied only to the battery 50.

Figure 20:
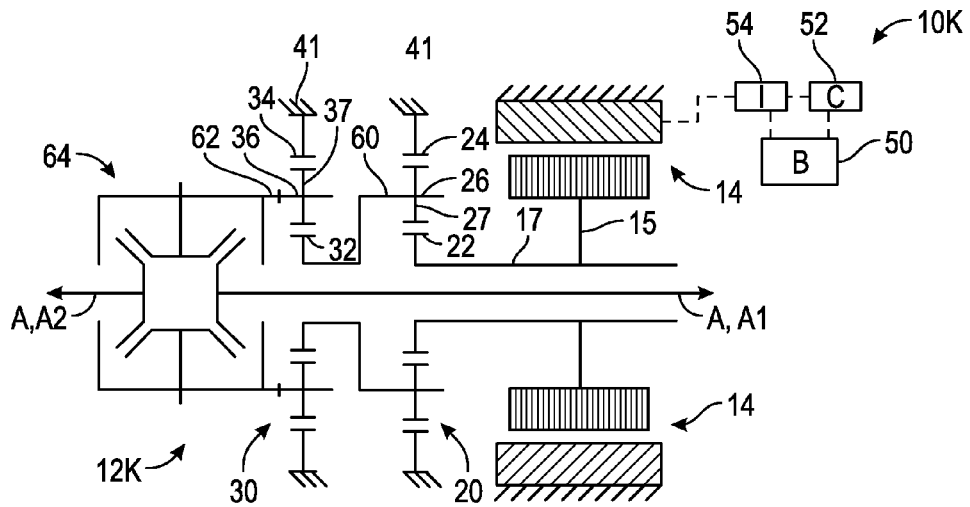
FIG. 20 is a schematic illustration in stick diagram form of an embodiment of a powertrain with an electric drive unit and including a control system in accordance with an alternative aspect of the present teachings.

FIG. 20 depicts an alternative embodiment of a powertrain 10K with an electric drive unit 12K that includes no clutches or brakes. The powertrain 10K has many of the same components as the powertrain 10. The first member of the planetary gear set 20 is the sun gear member 22, the second member is the carrier member 26, and the third member is the ring gear member 24. The first member of the planetary gear set 30 is the sun gear member 32, the second member is the ring gear member 34, and the third member is the carrier member 36. The interconnecting member 60 continuously connects the carrier member 26 for rotation in unison with the sun gear member 32. The third member of the first planetary gear set 20 (i.e., the ring gear member 24) is continuously grounded to the stationary member 41. The third member of the second planetary gear set 30 (i.e., the ring gear member 34) is continuously grounded to the stationary member 41. The electric drive unit 12K provides only one speed ratio determined by the ratio of the ring gear member to the sun gear member of each of the planetary gear sets 20, 30.

Figure 21:
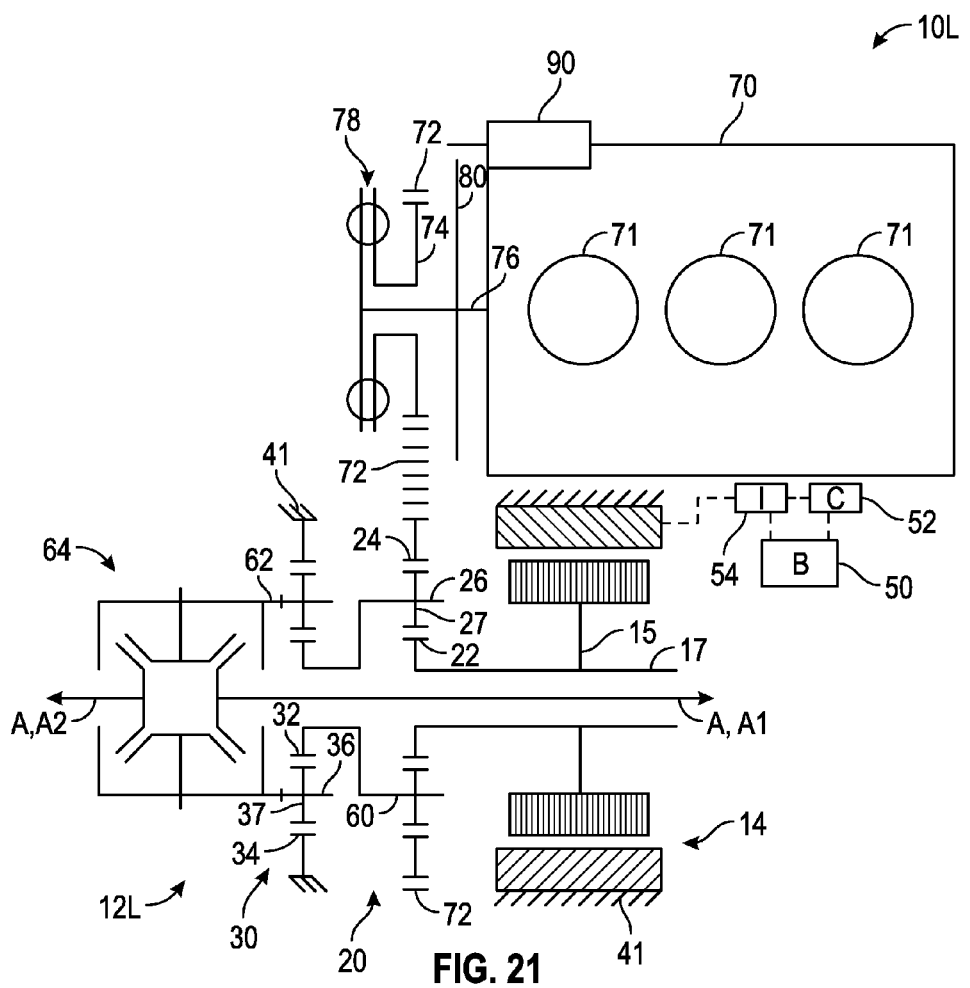
FIG. 21 is a schematic illustration in stick diagram form of a powertrain including an electric drive unit, a control system, and an engine operatively connected to the electric drive unit in accordance with an alternative aspect of the present teachings.
Figure 24:
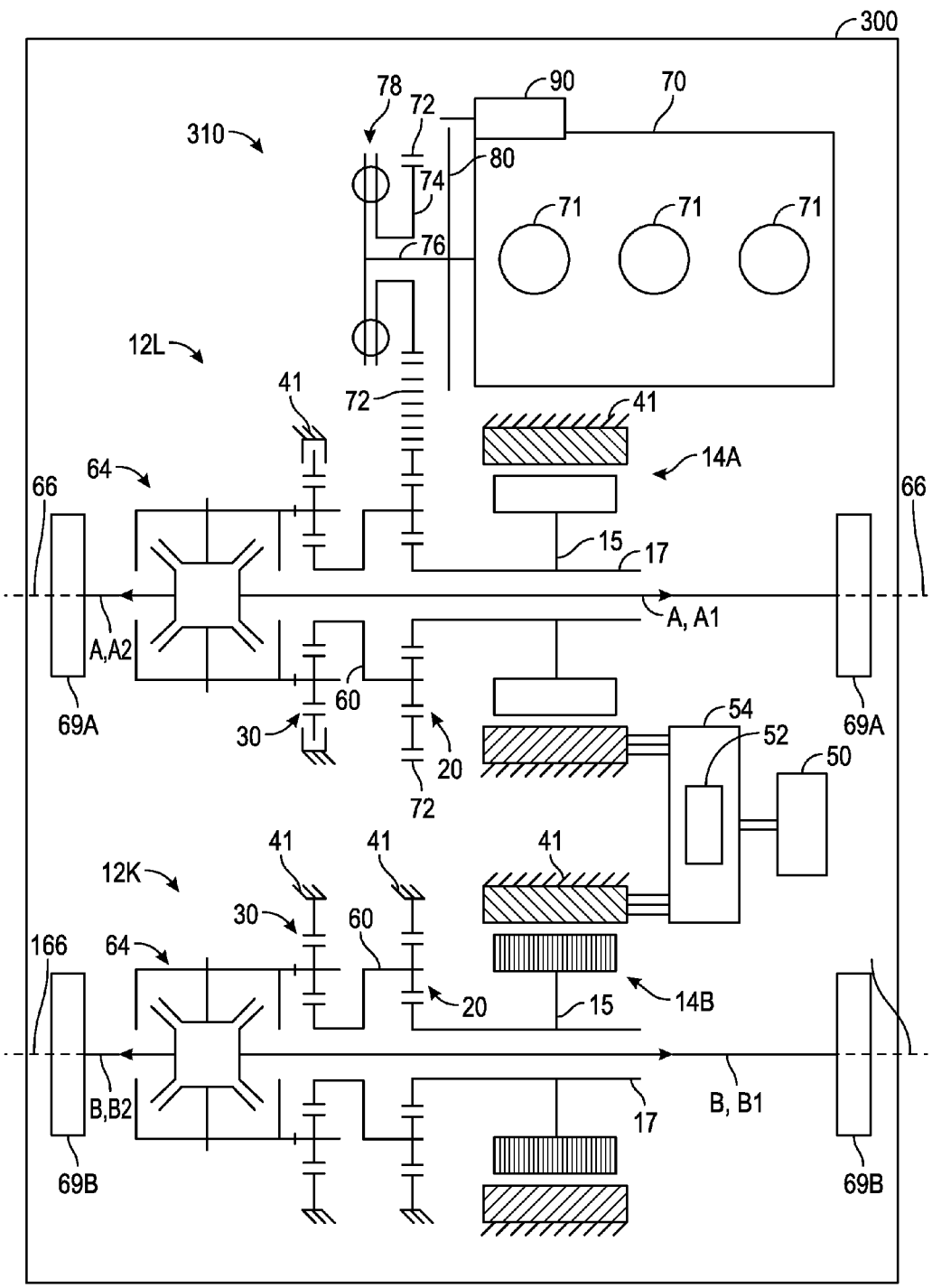
FIG. 24 is a schematic illustration of a vehicle having the powertrain of FIG. 21 operable to drive a first axle and the electric drive unit of FIG. 20 operable to drive a second axle.

FIG. 21 shows an alternative embodiment of a powertrain 10L with an electric drive unit 12L that includes the same components as the electric drive unit 12K except that the ring gear member 24 is connected via a chain 72 to an engine 70 in an input-split arrangement as described with respect to FIG. 8. The drive unit 12L is characterized by an absence any clutches and brakes. A starter motor 90 is provided for starting the engine 70. In FIG. 24, the drive units 12K and 12L are combined in an all-wheel drive powertrain 310 of a vehicle 300. The powertrain 310 includes the first drive unit 12L arranged concentrically about and driving a first axle A, shown as the front axle. The drive unit 12K is arranged concentrically about and drives a second axle B, shown as the rear axle. The electric machine of the drive unit 12L is referred to as 14A and the electric machine of the drive unit 12K is referred to as 14B as discussed with respect to FIG. 22. The drive units 12L and 12K used in the powertrain 310 share most of their parts in common and can be produced as modules consisting of all of the common parts. The powertrain 310 can thus be considered modular, having two of the modules, one at each drive axle. Additionally, the drive unit 12IK can be used by itself to drive an axle in a vehicle that does not have an engine 70, and has only the battery 50 as a power source and optionally also a fuel cell.

The drive unit 12L can provide an input power-split operating mode at the first drive axle A with the engine 70 on and driving the ring gear 24, and the electric machine 14A acting as a motor to drive the sun gear member 22, or as a generator, providing electrical power to the battery 50 and/or to the electric machine 14B. The electric machine 14B can be off during the input-split operating mode of drive unit 12L, or can be operated as a motor using energy supplied from the battery 50 and/or from the electric machine 14A to establish an input-split all-wheel drive operating mode. Additionally, the drive unit 12K can be used by itself in an electric-only operating mode in which only the axle B is driven and the engine 70 and the electric machine 14A are both off.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A powertrain comprising:
   an output member;
   a first planetary gear set;
   a second planetary gear set; wherein each of the first and the second planetary gear sets are simple planetary gear sets each having a sun gear member, a carrier member, and a ring gear member;
   a single electric machine operable as a motor and having a rotor connected to rotate in unison with and drive the sun gear member of the first planetary gear set;

an interconnecting member connecting the carrier member of the first planetary gear set to rotate in unison with the sun gear member of the second planetary gear set;
a first brake selectively engageable to ground the ring gear member of the first planetary gear set to a stationary member;
wherein the ring gear member of the second planetary gear set is continuously grounded to the stationary member; and
wherein the carrier member of the second planetary gear set is continuously operatively connected to the output member.

2. The powertrain of claim 1, further comprising:
a clutch selectively engageable to connect the sun gear member of the first planetary gear set to rotate in unison with the sun gear member of the second planetary gear set.

3. The powertrain of claim 1, wherein the second planetary gear set includes a stepped pinion gear supported for rotation on the carrier member of the second planetary gear set.

4. The powertrain of claim 1, further comprising:
an axle comprising first and second half shafts extending along an axis of rotation; and
wherein the output member, the electric machine, and the planetary gear sets are concentric with the half shafts and the output member is operatively connected to the half shafts so that the electric machine drives the half shafts through the planetary gear sets.

5. A powertrain comprising:
an engine;
a first axle;
a second axle parallel to and spaced from the first axle;
a first drive unit concentric with the first axle, and a second drive unit concentric with the second axle, each of the first drive unit and the second drive unit comprising:
an output member;
a stationary member;
a first planetary gear set;
a second planetary gear set wherein each of the first and the second planetary gear sets are simple planetary gear sets each having a sun gear member, a carrier member, and a ring gear member;
a single electric machine operable as a motor and having a rotor connected to rotate in unison with and drive the sun gear member of the first planetary gear set;
an interconnecting member connecting the carrier member of the first planetary gear set to rotate in unison with the sun gear member of the second planetary gear set;
wherein the ring gear member of the second planetary gear set is continuously grounded to the stationary member;
wherein the carrier member of the second planetary gear set is continuously operatively connected to the output member;
wherein the ring gear member of the first planetary gear set of the first drive unit is operatively connected to the engine to be driven by the engine;
wherein the output member of the first drive unit is operatively connected to the first axle; and
wherein the output member of the second drive unit is operatively connected to the second axle.

6. The powertrain of claim 5, wherein:
each of the first drive unit and the second drive unit include a clutch selectively engageable to connect the sun gear member of the first planetary gear set to rotate in unison with the carrier member of the first planetary gear set;
the first drive unit includes:
a first brake selectively engageable to ground the ring gear member of the second planetary gear set of the first drive unit to the stationary member of the first drive unit;
the second drive unit includes:
an additional brake selectively engageable to ground the ring gear member of the first planetary gear set of the second drive unit to the stationary member of the second drive unit; and
the powertrain being operable in an input-split all-wheel drive operating mode, an electric all-wheel drive operating mode, a hybrid series operating mode, and a parallel hybrid all-wheel drive operating mode.

7. A vehicle comprising:
an engine;
a first drive axle;
a second drive axle parallel with and spaced apart from the first drive axle;
a first modular drive unit operatively connected to the first drive axle;
a second modular drive unit operatively connected to the second drive axle;
each of first modular drive unit and the second modular drive unit having:
an output member;
a stationary member;
a first planetary gear set;
a second planetary gear set; wherein each of the first and the second planetary gear sets are simple planetary gear sets each having a sun gear member, a carrier member, and a ring gear member;
a single electric machine operable as a motor and having a rotor connected to rotate in unison with and drive the sun gear member of the first planetary gear set;
an interconnecting member connecting the carrier member of the first planetary gear set to rotate in unison with the sun gear member of the second planetary gear set;
a brake;
a clutch selectively engageable to connect the carrier member of the first planetary gear set to the sun gear member of the first planetary gear set;
wherein the ring gear member of the first planetary gear set of the first modular drive unit is operatively connected to the engine;
wherein the brake of the first modular drive unit is selectively engageable to ground the ring gear member of the second planetary gear set of the first modular drive unit to the stationary member of the first modular drive unit;
wherein the ring gear member of the second planetary gear set of the second modular drive unit is continuously grounded to the stationary member of the second modular drive unit; and
wherein the second modular drive unit is adapted to be:
an electric-only drive unit by engaging the brake of the second modular drive unit and powering the electric machine of the second modular drive unit; and wherein the first modular drive unit is adapted to be:
an input power-split drive unit by engaging the brake of the first modular drive unit and powering the engine and the electric machine of the first modular drive unit.

\* \* \* \* \*

UNITED STATES PATENT AND TRADEMARK OFFICE
CERTIFICATE OF CORRECTION

PATENT NO. : 9,950,607 B2
APPLICATION NO. : 14/939542
DATED : April 24, 2018
INVENTOR(S) : Joseph R. Littlefield et al.

Page 1 of 1

It is certified that error appears in the above-identified patent and that said Letters Patent is hereby corrected as shown below:

On the Title Page

Item (74), "Quin IP Law" should read --Quinn IP Law--.

Signed and Sealed this
Thirteenth Day of November, 2018

Andrei Iancu
*Director of the United States Patent and Trademark Office*